(12) United States Patent
Sakanoi et al.

(10) Patent No.: US 11,664,507 B2
(45) Date of Patent: May 30, 2023

(54) MANUFACTURING METHOD FOR FUEL CELL

(71) Applicant: TOYOTA JIDOSHA KABUSHIKI KAISHA, Toyota (JP)

(72) Inventors: Ryota Sakanoi, Toyota (JP); Hiroomi Kobayashi, Okazaki (JP); Yuta Watanabe, Nagoya (JP); Yoichi Hanakura, Toki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

(21) Appl. No.: 17/217,072

(22) Filed: Mar. 30, 2021

(65) Prior Publication Data

US 2021/0376336 A1  Dec. 2, 2021

(30) Foreign Application Priority Data

May 26, 2020  (JP) ............................ JP2020-091599

(51) Int. Cl.
*H01M 8/0206* (2016.01)
*H01M 8/0267* (2016.01)
*B23K 26/20* (2014.01)

(52) U.S. Cl.
CPC .......... *H01M 8/0206* (2013.01); *B23K 26/20* (2013.01); *H01M 8/0267* (2013.01)

(58) Field of Classification Search
CPC .......... B23K 26/20; H01M 2008/1095; H01M 8/0206; H01M 8/0267; Y02E 60/50; Y02P 70/50

See application file for complete search history.

(56) References Cited

U.S. PATENT DOCUMENTS

| | | | |
|---|---|---|---|
| 2008/0305385 A1* | 12/2008 | Smiljanich | H01M 8/0247 29/623.5 |
| 2015/0236358 A1 | 8/2015 | Hirata | |
| 2020/0083544 A1 | 3/2020 | Kataoka et al. | |

FOREIGN PATENT DOCUMENTS

| | | |
|---|---|---|
| CN | 101536235 A | 9/2009 |
| CN | 108436270 A | 8/2018 |
| JP | 09314362 A | 12/1997 |
| JP | H09314262 A | 12/1997 |

(Continued)

OTHER PUBLICATIONS

Atsuhiro Miura et al., U.S. Appl. No. 17/243,767, filed Apr. 29, 2021.

*Primary Examiner* — Victoria H Lynch
(74) *Attorney, Agent, or Firm* — Dickinson Wright, PLLC

(57) ABSTRACT

A manufacturing method for manufacturing a separator for a fuel cell includes a step of applying a laser beam to a surface of a plate-shaped metal plate having a rectangular shape such that an application range of the laser beam extends linearly. In the step, the laser beam is applied such that the application range includes a high-energy region in which energy to be given by the laser beam per unit distance in a direction where the application range extends linearly is high, and a low-energy region in which the energy is low. The high-energy region includes a first region, a second region, a third region, and a fourth region. The first region and the second region extend in parallel to one of long sides of the rectangular shape. The third region and the fourth region extend in parallel to the other one of the long sides.

6 Claims, 15 Drawing Sheets

(56) References Cited

FOREIGN PATENT DOCUMENTS

| | | |
|---|---|---|
| JP | 2004050316 A | 2/2004 |
| JP | 2007311069 A | 11/2007 |
| JP | 2015138745 A | 7/2015 |
| JP | 2015173108 A | 10/2015 |
| JP | 2020038814 A | 3/2020 |
| WO | 2007/135509 A1 | 11/2007 |
| WO | 2008/054774 A2 | 5/2008 |

\* cited by examiner

EMBODIMENT 3

MANUFACTURING METHOD FOR FUEL CELL

CROSS-REFERENCE TO RELATED APPLICATION

This application claims priority to Japanese Patent Application No. 2020-091599 filed on May 26, 2020, incorporated herein by reference in its entirety.

BACKGROUND

1. Technical Field

The technology described in the present specification relates to a manufacturing method for a fuel cell.

2. Description of Related Art

A fuel cell described in Japanese Unexamined Patent Application Publication No. 2015-173108 (JP 2015-173108 A) includes a separator constituted by a metal plate. The fuel cell is configured such that the separator is bonded to a frame in which an electrode member is accommodated.

SUMMARY

When a laser beam is applied to a separator, a surface of the separator may be reformed. For example, when the laser beam is applied to the separator, dirt on the surface of the separator may be removed. When the laser beam is applied to the separator as such, an outer layer part of the separator melts and then solidifies. The outer layer part of the separator contracts when it solidifies, so that a warp is caused in the separator. In the related art, it is difficult to control the warping amount of the separator to be warped due to application of the laser beam, and the warping amount largely varies. That is, the shape of the separator after a laser application step largely varies. Because of this, defects might occur when a fuel cell is manufactured by use of the separator. The present specification proposes a manufacturing method for manufacturing a separator, and the manufacturing method can restrain variation in the warping amount of the separator to be warped in a laser application step.

A manufacturing method for manufacturing a separator for a fuel cell, described in the present specification, includes a step of applying a laser beam to a surface of a plate-shaped metal plate having a rectangular shape such that an application range of the laser beam extends linearly. In the step, the laser beam is applied such that the application range includes a high-energy region in which energy to be given by the laser beam per unit distance in a direction where the application range extends linearly is high, and a low-energy region in which the energy is low. The high-energy region includes a first region, a second region, a third region, and a fourth region separated from each other. The first region and the second region extend in parallel to one of long sides provided as a pair in the rectangular shape. The third region and the fourth region extend in parallel to the other one of the long sides. A central line of the surface is placed between the first region and the second region and between the third region and the fourth region, the central line extending in a direction perpendicular to the long sides.

In the manufacturing method, the laser beam is applied to the surface of the metal plate so that high energy is given to four high-energy regions (the first regions to the fourth regions). As a result, large warps are caused in the four high-energy regions in the metal plate. When the large warps are caused in the first region to the fourth region that are placed dispersedly as such, a warping amount caused in the whole metal plate becomes stable, thereby resulting in that the shape of the metal plate (that is, a separator) after a laser application step becomes stable. Thus, with the manufacturing method, it is possible to restrain variation in the warping amount of the separator.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Technical elements described in the present disclosure are listed below. Note that the technical elements to be described below are useful independently from each other.

In the manufacturing method as one example described in the present specification, the laser beam may be applied to the high-energy region at a higher energy density than the low-energy region. Further, in the manufacturing method as one example described in the present specification, the width of the high-energy region may be wider than the width of the low-energy region.

In any of the manufacturing methods, energy given to the high-energy region by the laser beam per unit distance can be made higher than energy given to the low-energy region by the laser beam per unit distance.

In the manufacturing method as one example described in the present specification, in the step, the laser beam may be applied such that the application range extends annularly in parallel to an outer peripheral edge of the surface.

In the manufacturing method as one example described in the present specification, in the step, a warp may be caused in the metal plate such that the surface has a recessed shape. The manufacturing method may further include a step of applying the laser beam to a range including a top portion of the warp on a back surface of the metal plate, the back surface being opposite to the surface of the metal plate.

With the manufacturing method, it is possible to reduce warps to be caused in a separator.

In the manufacturing method as one example described in the present specification, in the step of applying the laser beam to the back surface, the laser beam may be applied such that an application range of the laser beam extends linearly along a direction intersecting with the long sides.

With the manufacturing method, it is possible to more effectively reduce warps to be caused in the separator.

In the manufacturing method as one example described in the present specification, the back surface of the metal plate may include a groove region in which grooves are formed, and a flat region placed around the groove region. In the step of applying the laser beam to the back surface, the laser beam may be applied to the flat region.

When the laser beam is applied to the flat region as such, the laser beam is easily absorbed by the metal plate, so that warps to be caused in the separator can be more effectively reduced.

Figure 1:
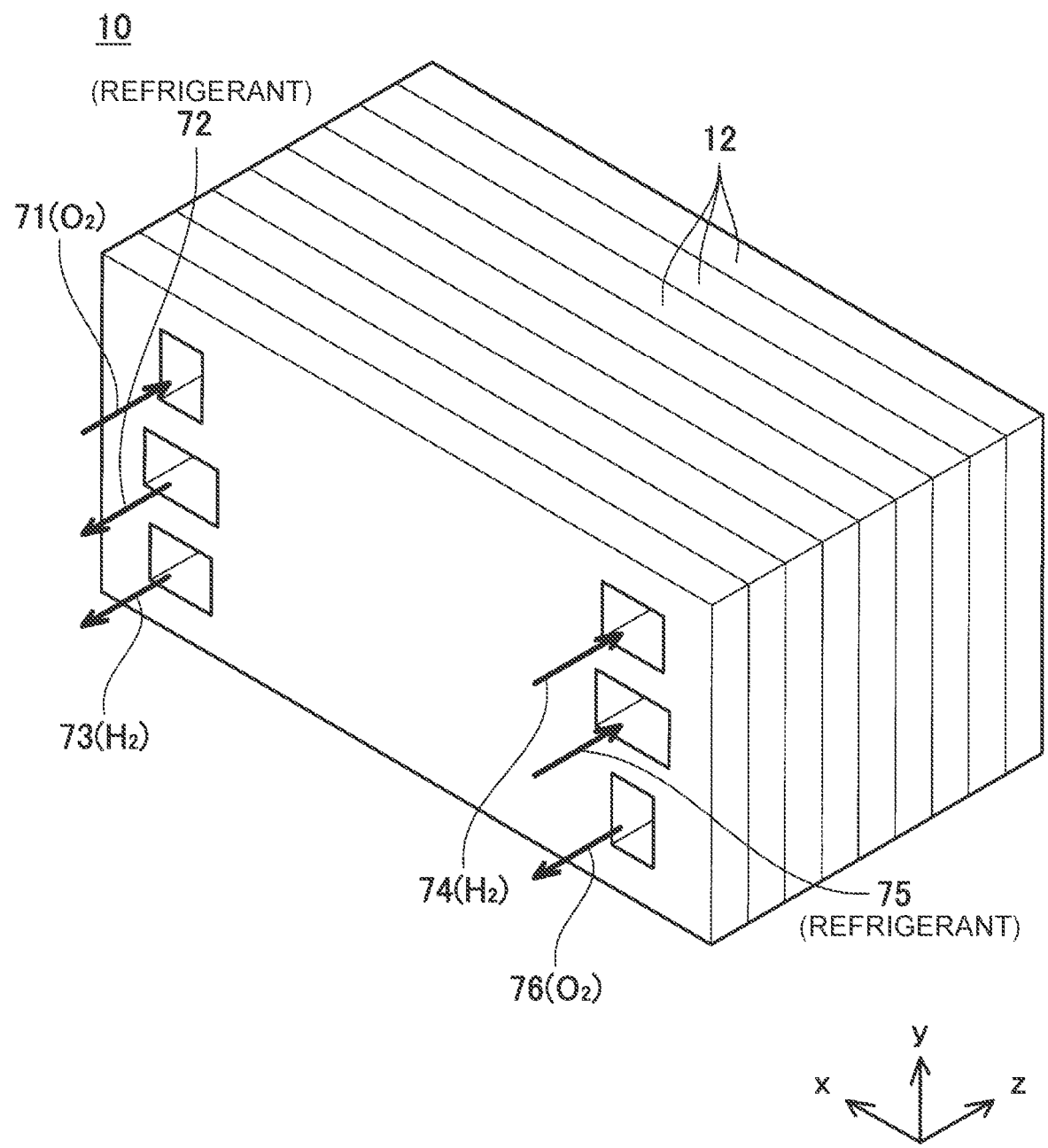
FIG. 1 is a perspective view of a fuel cell stack.

A fuel cell stack 10 illustrated in FIG. 1 is constituted by a laminated body including a plurality of fuel cells 12. In the drawings including FIG. 1, a direction where the fuel cells 12 are laminated is indicated by a z-direction, one direction perpendicular to the z-direction is indicated by an x-direction, and a direction perpendicular to the x-direction and the z-direction is indicated by ay-direction. Passages 71 to 76 are provided in the fuel cell stack 10. The passages 71 to 76 extend in the z-direction from an end surface of the fuel cell stack 10. The passage 71 is an oxidant gas supply passage, and the passage 76 is an oxidant gas discharge passage. Oxidant gas (oxygen ($O_2$) in the present embodiment) is supplied to the fuel cells 12 through the oxidant gas supply passage 71. The oxidant gas that has passed through the fuel cells 12 is discharged to outside the fuel cell stack 10 through the oxidant gas discharge passage 76. The passage 74 is a fuel gas supply passage, and the passage 73 is a fuel gas discharge passage. Fuel gas (hydrogen ($H_2$) in the present embodiment) is supplied to the fuel cells 12 through the fuel gas supply passage 74. The fuel gas that has passed through the fuel cells 12 is discharged to outside the fuel cell stack 10 through the fuel gas discharge passage 73. When the fuel gas and the oxidant gas are supplied to the fuel cells, power generation is performed in the fuel cells 12. The passage 75 is a refrigerant supply passage, and the passage 72 is a refrigerant discharge passage. Refrigerant is supplied to the fuel cells 12 through the refrigerant supply passage 75. The refrigerant that has passed through the fuel cells 12 is discharged to outside the fuel cell stack 10 through the refrigerant discharge passage 72. The fuel cells 12 are cooled by the refrigerant flowing through the fuel cell stack 10.

Figure 2:
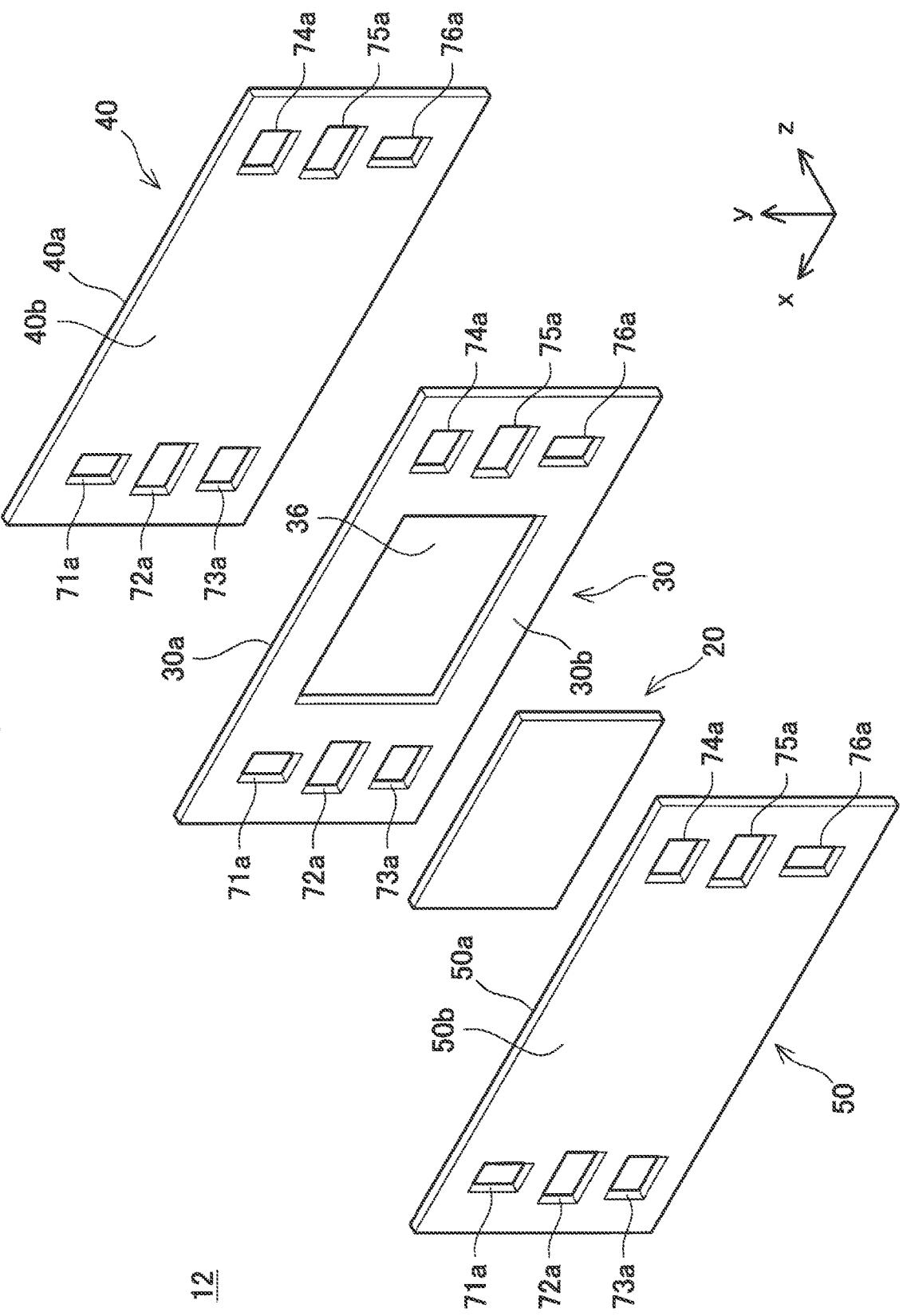
FIG. 2 is an exploded perspective view of a fuel cell.

FIG. 2 is an exploded perspective view of one fuel cell 12. As illustrated in FIG. 2, the fuel cell 12 includes a membrane electrode assembly (hereinafter referred to as MEA) 20, a resin frame 30, a separator 40, and a separator 50. The resin frame 30, the separator 40, and the separator 50 have a rectangular plate shape elongated in the x-direction. The resin frame 30, the separator 40, and the separator 50 are laminated in the z-direction. In the following description, a surface, of the resin frame 30, that is close to the separator 40 is referred to as a surface 30a, and a surface, of the resin frame 30, that is opposite to the surface 30a is referred to as a surface 30b. Further, in the following description, a surface, of the separator 40, that is close to the resin frame 30 is referred to as a surface 40b, and a surface, of the separator 40, that is opposite to the surface 40b is referred to as a surface 40a. Further, in the following description, a surface, of the separator 50, that is close to the resin frame 30 is referred to as a surface 50a, and a surface, of the separator 50, that is opposite to the surface 50a is referred to as a surface 50b. A through-hole 36 penetrating through the resin frame 30 in the z-direction is provided in the center of the resin frame 30. The MEA 20 is placed in the through-hole 36. The surface 40b of the separator 40 is bonded to the surface 30a of the resin frame 30. The through-hole 36 is covered with the separator 40. The surface 50a of the separator 50 is bonded to the surface 30b of the resin frame 30. The through-hole 36 is covered with the separator 50. Thus, the resin frame 30 is sandwiched between the separator 40 and the separator 50.

The resin frame 30, the separator 40, and the separator 50 each have a through-hole 71a corresponding to the passage 71, a through-hole 72a corresponding to the passage 72, a through-hole 73a corresponding to the passage 73, a through-hole 74a corresponding to the passage 74, a through-hole 75a corresponding to the passage 75, and a through-hole 76a corresponding to the passage 76. When the fuel cell 12 is viewed in a plan view along the z-direction, the through-hole 36 (that is, the MEA 20) is placed between the through-holes 71a, 72a, 73a and the through-holes 74a, 75a, 76a.

Figure 3:
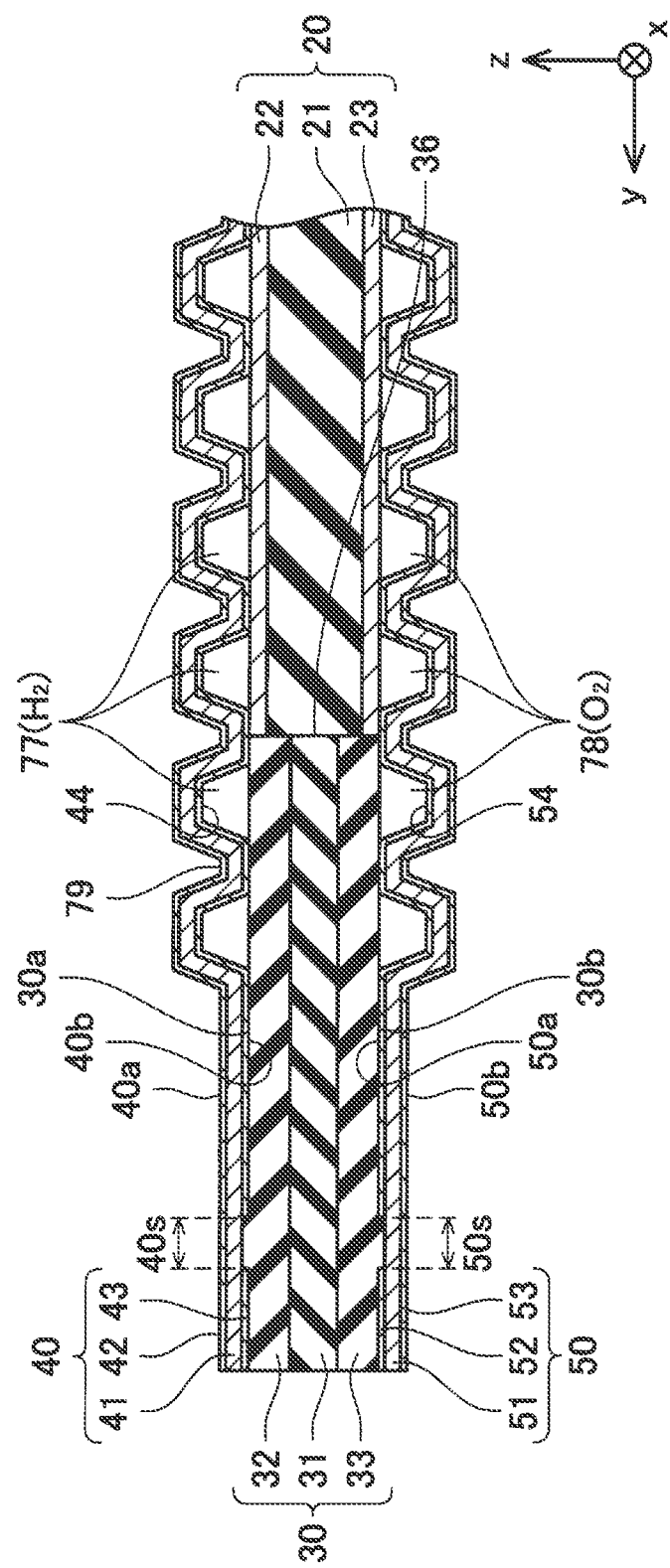
FIG. 3 is a sectional view of the fuel cell (a sectional view taken along a line in FIGS. 4, 5)

The resin frame 30 is an insulating member. As illustrated in FIG. 3, the resin frame 30 includes resin layers 31, 32, 33 laminated in the z-direction. The resin layers 31, 32, 33 are all made of insulating resin (e.g., acid-modified polypropylene or the like). The resin layer 31 has high rigidity. The resin layers 32, 33 have thermoplasticity and exhibit high adhesiveness when the resin layers 32, 33 are soften. The resin layer 31 is sandwiched between the resin layer 32 and the resin layer 33. The resin layer 32 is bonded to the separator 40, and the resin layer 33 is bonded to the separator 50.

The MEA 20 includes an electrolyte membrane 21, an anode layer 22, and a cathode layer 23. The electrolyte membrane 21 is made of a solid polymer material. The anode layer 22 and the cathode layer 23 are made of a material in which conductive particles including catalyst such as platinum are dispersed in electrolyte, or the like. The anode layer 22 covers a surface of the electrolyte membrane 21 on a side closer to the separator 40. The cathode layer 23 covers a surface of the electrolyte membrane 21 on a side closer to the separator 50.

The separator 40 is an electrically-conductive member. The separator 40 includes a metal plate 41 and carbon films 42, 43. The metal plate 41 is made of titanium (Ti) or titanium alloy. The carbon film 43 covers a surface of the metal plate 41 on a side closer to the resin frame 30 and the MEA 20. The carbon film 42 covers a surface of the metal plate 41 on a side opposite to the carbon film 43.

Figure 4:
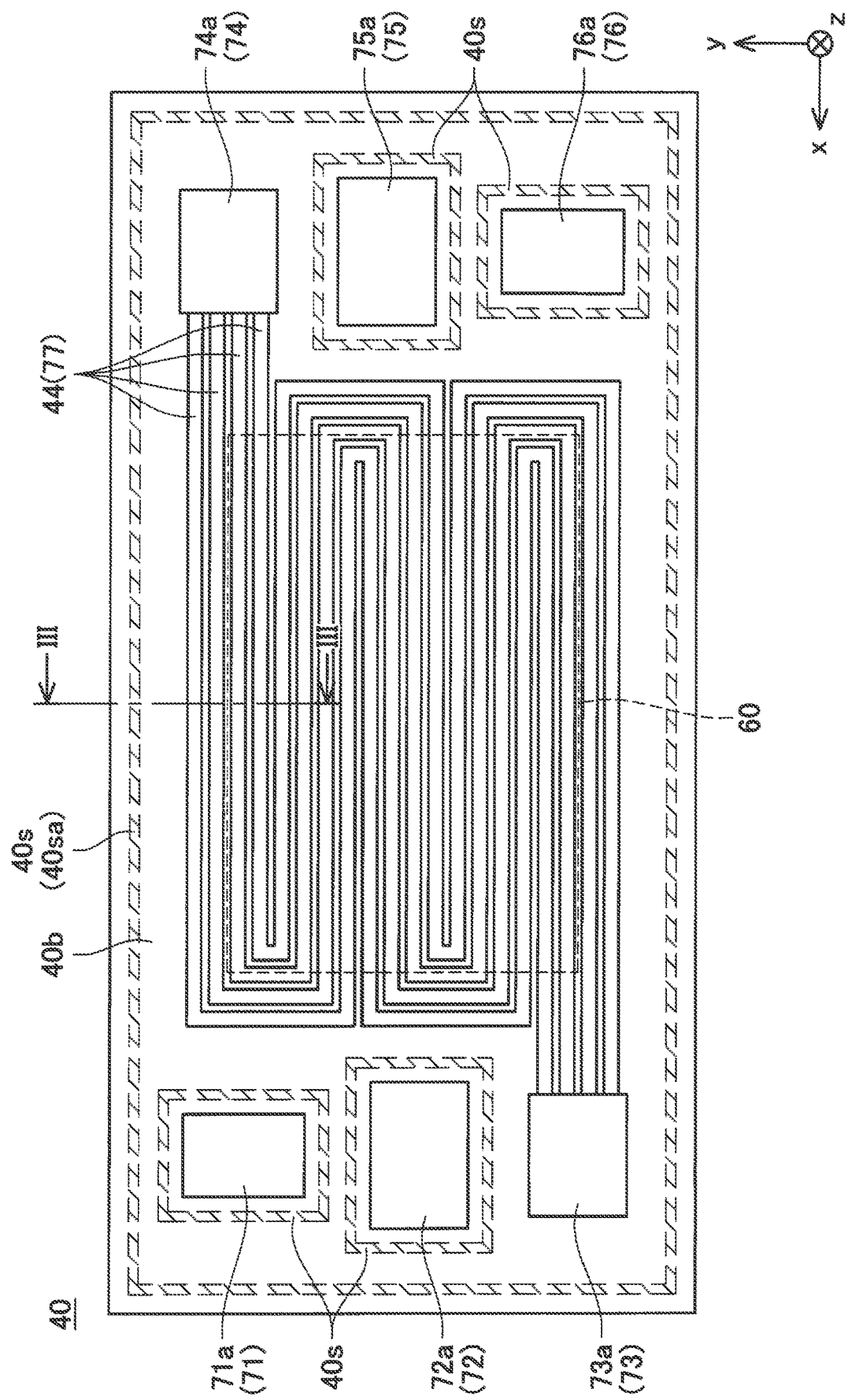
FIG. 4 is a plan view of a surface 40b of a separator 40.

The separator 40 partially bends, so that the surface 40b of the separator 40 has grooves 44. As illustrated in FIG. 4, the grooves 44 extend from the through-hole 74a to the through-hole 73a. A range 60 in FIG. 4 indicates a range where the separator 40 faces the MEA 20 (a range where the separator 40 and the MEA 20 overlap each other when they are viewed along the z-direction). The grooves 44 extend in a meandering manner within the range 60. As illustrated in FIG. 3, parts of the surface 40b of the separator 40 other than the grooves 44 make contact with the resin frame 30 and the MEA 20. More specifically, parts of the surface 40b other than the grooves 44 make contact with the resin layer 32 of the resin frame 30 and the anode layer 22 of the MEA 20. Fuel gas passages 77 are each constituted by a space surrounded by each groove 44, the resin frame 30, and the MEA 20. The fuel gas passages 77 extend along an interface between the separator 40 and the resin frame 30 and an interface between the separator 40 and the MEA 20. The fuel gas flowing through the fuel gas supply passage 74 (the through-hole 74a) flows into the fuel gas passages 77. After the fuel gas flows through the fuel gas passages 77 from their upstream ends to their downstream ends, the fuel gas is discharged to the fuel gas discharge passage 73 (the through-hole 73a).

As illustrated in FIG. 3, the carbon film 43 is not provided in a range 40s that is a part of the surface 40b. The separator 40 is bonded to the resin layer 32 of the resin frame 30 within the range 40s. That is, the metal plate 41 in the range 40s is bonded to the resin layer 32 of the resin frame 30. As illustrated in FIG. 4, respective ranges 40s where the carbon film 43 is not provided are provided on the surface 40b so as to surround the through-holes 71a, 72a, 75a, 76a. Further, the range 40s is provided on the surface 40b so as to be parallel to an outer peripheral edge of the separator 40. In the following description, among the ranges 40s, a part parallel to the outer peripheral edge of the separator 40 is referred to as a range 40sa. The range 40sa extends annularly in parallel to the outer peripheral edge of the separator 40. The range 40sa surrounds the whole periphery of a range where the grooves 44 and the through-holes 71a to 76a are provided. In the ranges 40s illustrated in FIG. 4, the separator 40 is bonded to the resin frame 30.

The separator 50 is an electrically-conductive member. As illustrated in FIG. 3, the separator 50 includes a metal plate 51 and carbon films 52, 53. The metal plate 51 is made of titanium (Ti) or titanium alloy. The carbon film 52 covers a surface of the metal plate 51 on a side closer to the resin frame 30 and the MEA 20. The carbon film 53 covers a surface of the metal plate 51 on a side opposite to the carbon film 52.

Figure 5:
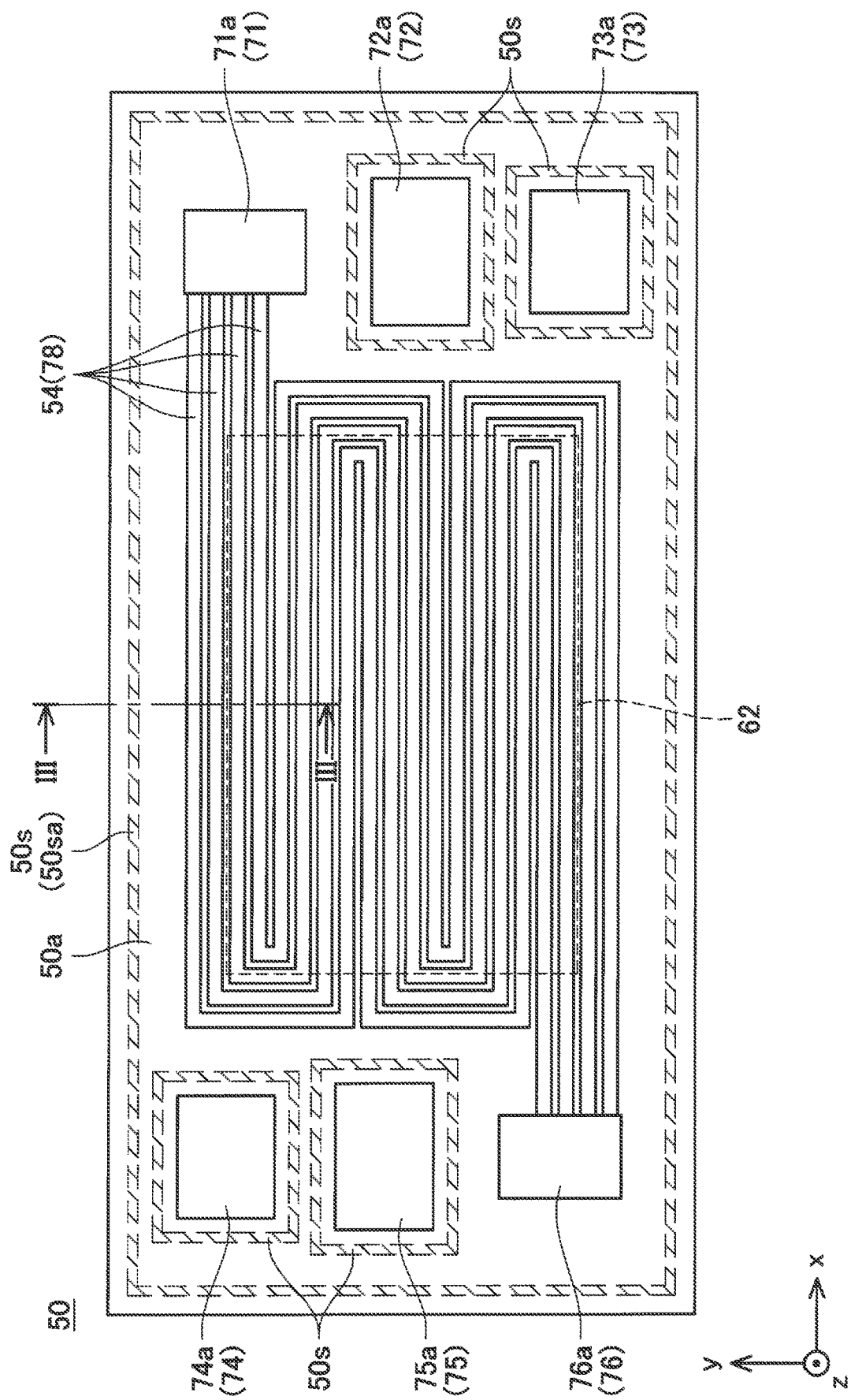
FIG. 5 is a plan view of a surface 50a of a separator 50.

As illustrated in FIG. 3, the separator 50 partially bends, so that the surface 50a of the separator 50 has grooves 54. As illustrated in FIG. 5, the grooves 54 extend from the through-hole 71a to the through-hole 76a. A range 62 in FIG. 5 indicates a range where the separator 50 faces the MEA 20 (a range where the separator 50 and the MEA 20 overlap each other when they are viewed along the z-direction). The grooves 54 extend in a meandering manner within the range 62. As illustrated in FIG. 3, parts of the surface 50a of the separator 50 other than the grooves 54 make contact with the resin frame 30 and the MEA 20. More specifically, parts of the surface 50a other than the grooves 54 make contact with the resin layer 33 of the resin frame 30 and the cathode layer 23 of the MEA 20. Oxidant gas passages 78 are each constituted by a space surrounded by each groove 54, the resin frame 30, and the MEA 20. The oxidant gas passages 78 extend along an interface between the separator 50 and the resin frame 30 and an interface between the separator 50 and the MEA 20. The oxidant gas flowing through the oxidant gas supply passage 71 (the through-hole 71a) flows into the oxidant gas passages 78. After the oxidant gas flows through the oxidant gas passages 78 from their upstream ends to their downstream ends, the oxidant gas is discharged to the oxidant gas discharge passage 76 (the through-hole 76a).

As illustrated in FIG. 3, the carbon film 52 is not provided in a range 50s that is a part of the surface 50a. The separator 50 is bonded to the resin layer 33 of the resin frame 30 within the range 50s. That is, the metal plate 51 in the range 50s is bonded to the resin layer 33 of the resin frame 30. As illustrated in FIG. 5, respective ranges 50s where the carbon film 52 is not provided are provided on the surface 50a so as to surround the through-holes 72a, 73a, 74a, 75a. Further, the range 50s is provided on the surface 50a so as to be parallel to an outer peripheral edge of the separator 50. In the following description, among the ranges 50s, a part parallel to the outer peripheral edge of the separator 50 is referred to as a range 50sa. The range 50sa extends annularly in parallel to the outer peripheral edge of the separator 50. The range 50sa surrounds the whole periphery of a range where the grooves 54 and the through-holes 71a to 76a are provided. In the ranges 50s illustrated in FIG. 5, the separator 50 is bonded to the resin frame 30.

When the fuel cell 12 is activated, the fuel gas is introduced into the fuel gas passage 77, and the oxidant gas is introduced into the oxidant gas passage 78. Hereby, the fuel gas and the oxidant gas are supplied to the MEA 20, so that power generation is performed by the MEA 20. Electric power generated by the MEA 20 is taken out to outside by the separator 40 and the separator 50. That is, the separator 40 and the separator 50 function as wiring lines. Since the surfaces of the separators 40, 50 are covered with the carbon films, the separators 40, 50 have a high conductivity. Accordingly, electric power is supplied from the MEA 20 to the outside with low loss.

Metal Plate Forming Step

Next will be described a manufacturing method for manufacturing the separator 40 of Embodiment 1. First, the through-holes 71a to 76a and the grooves 44 are formed in the metal plate 41 by press working or the like.

Coating Step

Figure 6:
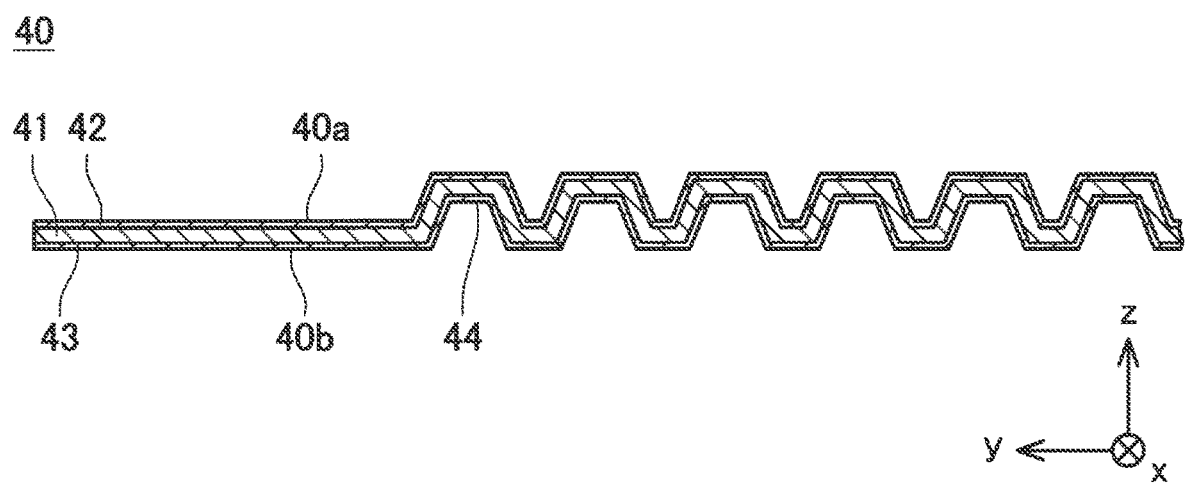
FIG. 6 is an explanatory view of a manufacturing method for manufacturing the separator 40.

Then, as illustrated in FIG. 6, the carbon films 42, 43 are formed to cover the whole surface of the metal plate 41. Herein, the carbon films 42, 43 are formed with a thickness of 10 nm to 100 nm.

Laser Application Step

Figure 7:
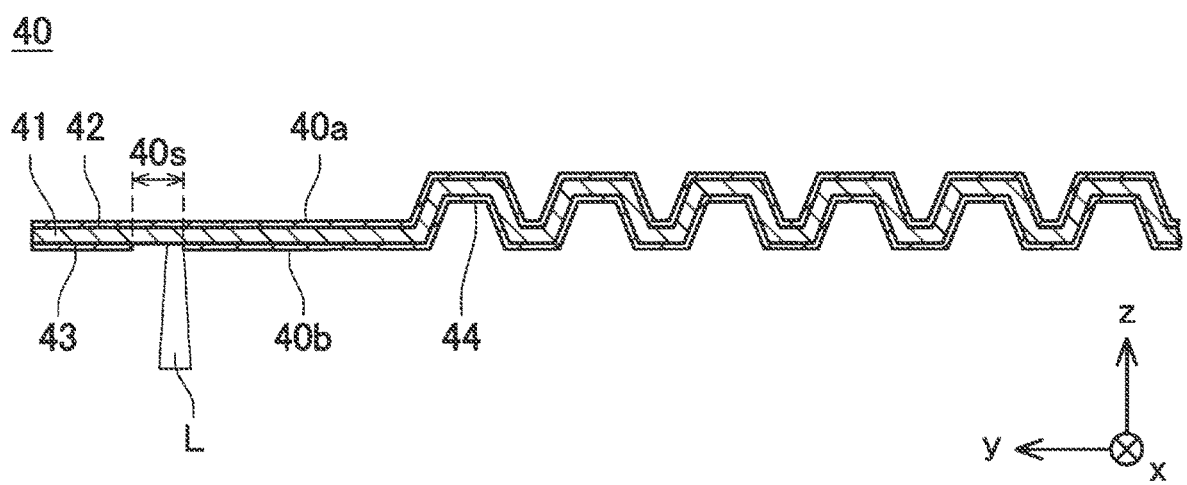
FIG. 7 is an explanatory view of the manufacturing method for manufacturing the separator 40.

Then, as illustrated in FIG. 7, a laser beam L (for example, a YAG laser beam) is applied to part of the surface 40b (that is, a surface of the carbon film 43) of the separator 40. Since the carbon film 43 easily absorbs a laser beam, the separator 40 is heated to a high temperature within an application range of the laser beam. Because of this, the carbon film 43 is removed by evaporation. Hereby, the ranges 40s in which the carbon film 43 is removed are formed. Herein, the ranges 40s are formed as illustrated in FIG. 4 by moving a laser spot. Thus, the ranges 40s correspond to application ranges of the laser beam. Further, in a case where dirt (e.g., a residual substance of lubricant) is attached on the surface of the metal plate 41, the dirt evaporates together with the carbon film 43. Accordingly, the metal plate 41 is exposed in a state where almost no dirt remains within the ranges 40s.

Figure 8:
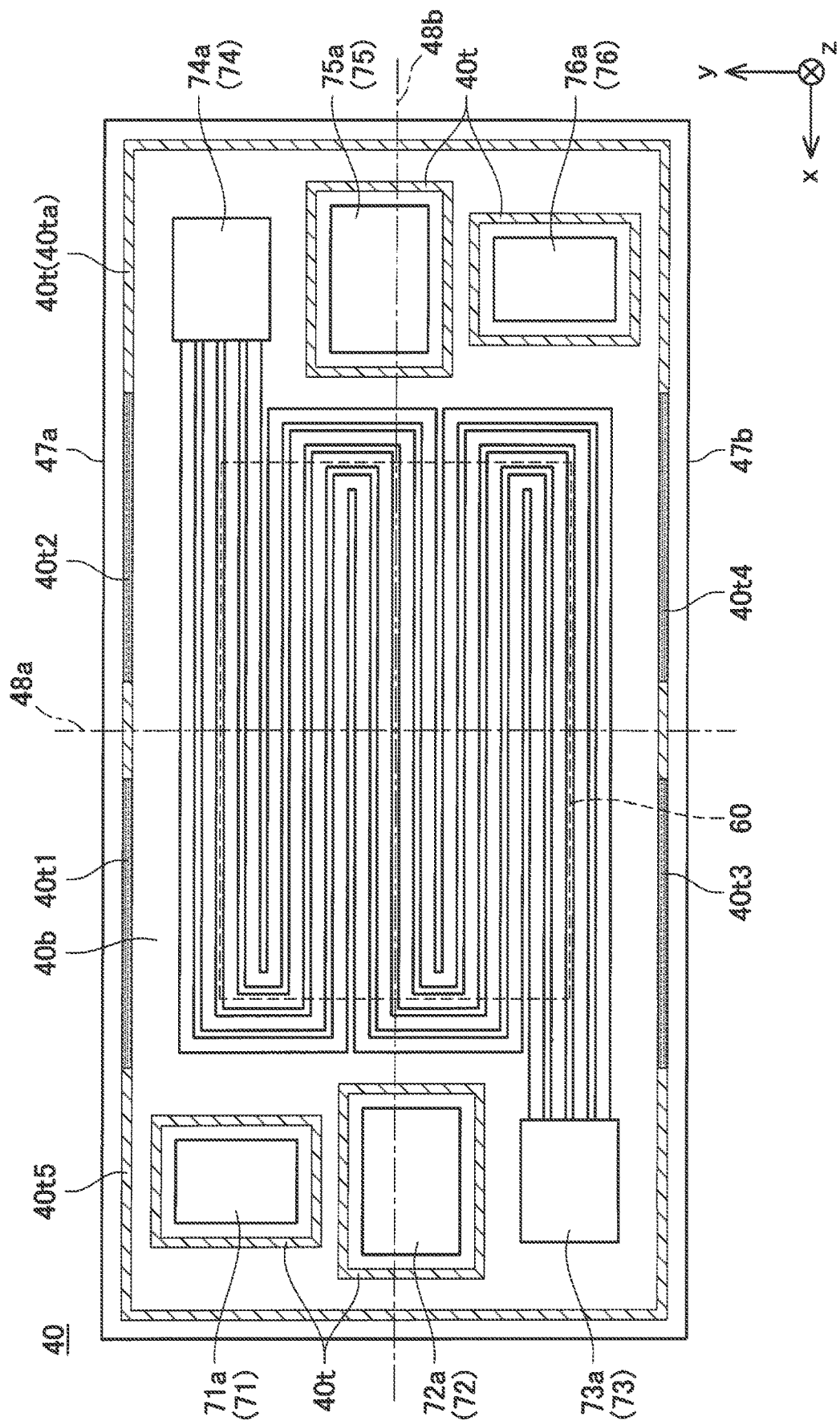
FIG. 8 is a plan view of the surface 40b of the separator 40 and illustrates laser application ranges 40t in Embodiment 1.

Ranges 40t (ranges with hatching) in FIG. 8 indicate laser application ranges in the laser application step. As described above, the laser application ranges 40t correspond to the ranges 40s in FIG. 4. In the following description, among the laser application ranges 40t, a part parallel to the outer peripheral edge of the surface 40b is referred to as a laser application range 40ta. In the laser application step, the energy density (mJ/mm$^2$) of the laser beam is changed in accordance with positions. As illustrated in FIG. 8, in the laser application ranges 40t, four high-energy regions 40t1 to 40t4 are set. The high-energy regions 40t1 to 40t4 are all included in the laser application range 40ta (the part parallel to the outer peripheral edge of the separator 40). In the following description, regions other than the high-energy regions 40t1 to 40t4 in the laser application ranges 40t are referred to low-energy regions 40t5. In the laser application step, the laser beam is applied to the high-energy regions 40t1 to 40t4 with a higher energy density than that of the laser beam applied to the low-energy regions 40t5. For example, the energy density to the high-energy regions 40t1 to 40t4 can be set to an energy density that is not less than 1.5 times the energy density to the low-energy regions 40t5. For example, the laser beam can be applied to the high-energy regions 40t1 to 40t4 at an energy density of 33 mJ/mm$^2$, while the laser beam can be applied to the low-energy regions 40t5 at an energy density of 19 mJ/mm$^2$. Note that the energy density of the laser beam may be adjusted by changing the output (W) of the laser beam, may be adjusted by changing the oscillation frequency of the laser beam, may be adjusted by changing the laser spot diameter of the laser beam, may be adjusted by changing the moving speed of the laser spot of the laser beam, or may be adjusted by changing the pulse width of the laser beam. The high-energy regions 40t1 to 40t4 are separated from each other. The high-energy regions 40t1, 40t2 extend along a long side 47a out of long sides 47a, 47b provided as a pair in the surface 40b having a rectangular shape. The high-energy regions 40t3, 40t4 extend along the long side 47b. The high-energy region 40t1 is placed at a position corresponding to the high-energy region 40t3 in the y-direction. The high-energy region 40t2 is placed at a position corresponding to the high-energy region 40t4 in the y-direction. A central line 48a illustrated in FIG. 8 is a central line, of the surface 40a, that extends in a direction perpendicular to the long sides 47a, 47b, and a central line 48b is a central line, of the surface 40a, that extends in parallel to the long sides 47a, 47b. The high-energy regions 40t1, 40t2 are placed on the opposite sides of the central line 48a. That is, the central line 48a is placed between the high-energy region 40t1 and the high-energy region 40t2. The high-energy regions 40t3, 40t4 are placed on the opposite sides of the central line 48a. That is, the central line 48a is placed between the high-energy region 40t3 and the high-energy region 40t4. The high-energy regions 40t1, 40t3 are placed on the opposite sides of the central line 48b. That is, the central line 48b is placed between the high-energy region 40t1 and the high-energy region 40t3. The high-energy regions 40t2, 40t4 are placed on the opposite sides of the central line 48b. That is, the central line 48b is placed between the high-energy region 40t2 and the high-energy region 40t4.

Figure 9:
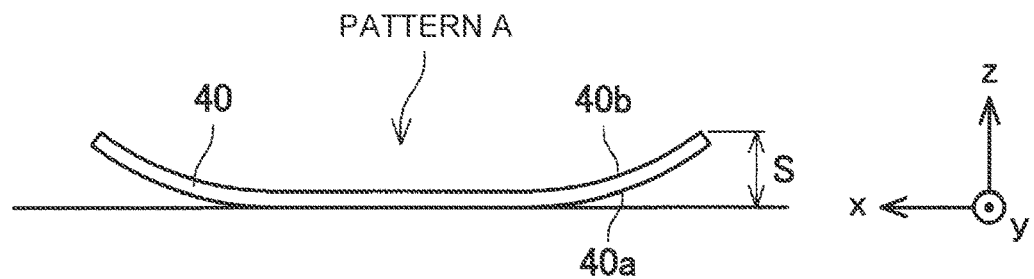
FIG. 9 is a sectional view illustrating a warping amount of the separator 40 manufactured by a conventional manufacturing method.
Figure 10:
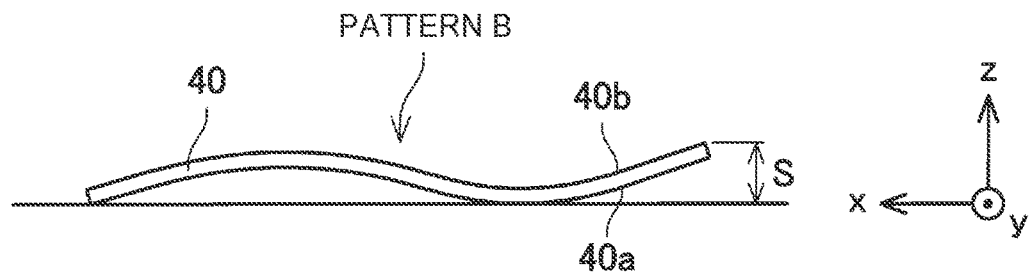
FIG. 10 is a sectional view illustrating a warping amount of the separator 40 manufactured by the conventional manufacturing method.
Figure 11:
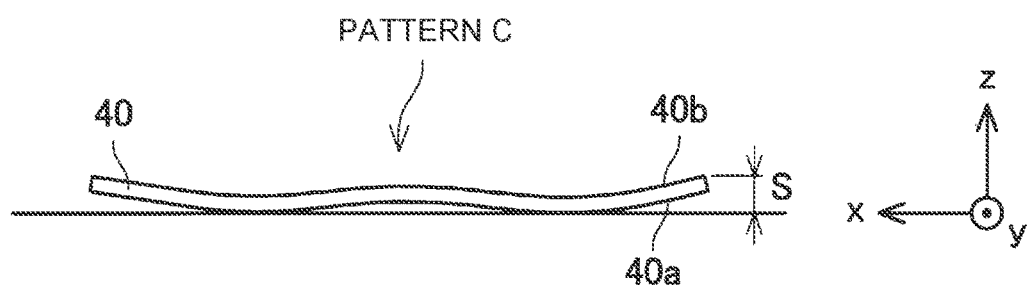
FIG. 11 is a sectional view illustrating a warping amount of the separator 40 manufactured by the conventional manufacturing method.
Figure 12:
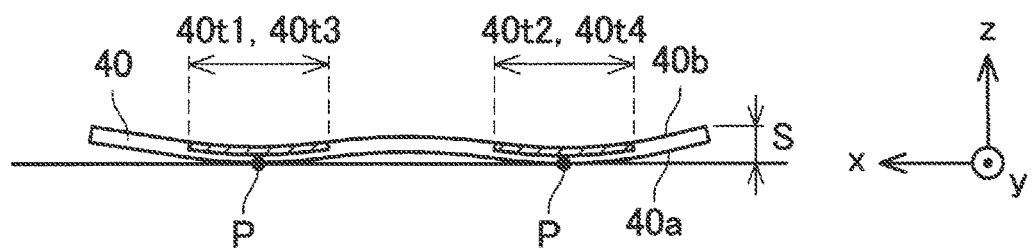
FIG. 12 is a sectional view illustrating a warping amount of the separator 40 manufactured by the manufacturing method of the embodiment.

When the laser beam is applied to the separator 40 in the laser application step, an outer layer part of the metal plate 41 within the laser application ranges 40t melts and then solidifies. The part thus melting in the metal plate 41 contracts when the part solidifies. On this account, a stress difference is caused between a surface, of the metal plate 41, to which the laser beam is applied and a back surface to the surface, so that a warp is caused in the metal plate 41 (that is, the separator 40). More specifically, the separator 40 warps such that the surface 40b to which the laser beam is applied becomes a recessed shape and the surface 40a, of the separator 40, that is the back surface to the surface 40b becomes a projecting shape. In a case where the laser beam is applied to the whole laser application ranges 40t at a uniform energy density, respective warping amounts caused in respective separators 40 to be manufactured become different from each other due to balance in stress to be caused in the whole metal plates 41 of the separators 40. For example, the following cases are conceivable: a case where a warping amount S is large as illustrated in FIG. 9; a case where the warping amount S is moderate as illustrated in FIG. 10; and a case where the warping amount S is small as illustrated in FIG. 11. Note that, as illustrated in FIGS. 9 to 11, the warping amount S indicates the height of an uppermost part of the separator 40 when the separator 40 is placed on a plane. As such, in a case where the laser beam is applied to the whole laser application ranges 40t at a uniform density, the shape of the separator 40 after the laser application step largely varies. On the other hand, when the laser beam is applied to the four high-energy regions 40t1 to 40t4 at a high energy density, the depth and width of parts melting and solidifying in the metal plate 41 within the high-energy regions 40t1 to 40t4 are large. As a result, as illustrated in FIG. 12, warps are mainly caused in ranges corresponding to the high-energy regions 40t1 to 40t4, so that a warping amount caused in the whole separator 40 becomes stable. Accordingly, the shape of the separator 40 after the laser application step can hardly vary.

As described above, with the manufacturing method for manufacturing the separator 40 in Embodiment 1, it is possible to restrain variation in the warping amount of the separator 40. Further, when the separator 50 is manufactured by a manufacturing method generally similar to that of the separator 40, it is possible to restrain variation in the warping amount. Next will be described a method for manufacturing the fuel cell 12 by use of the separators 40, 50.

Separator Bonding Step

Figure 13:
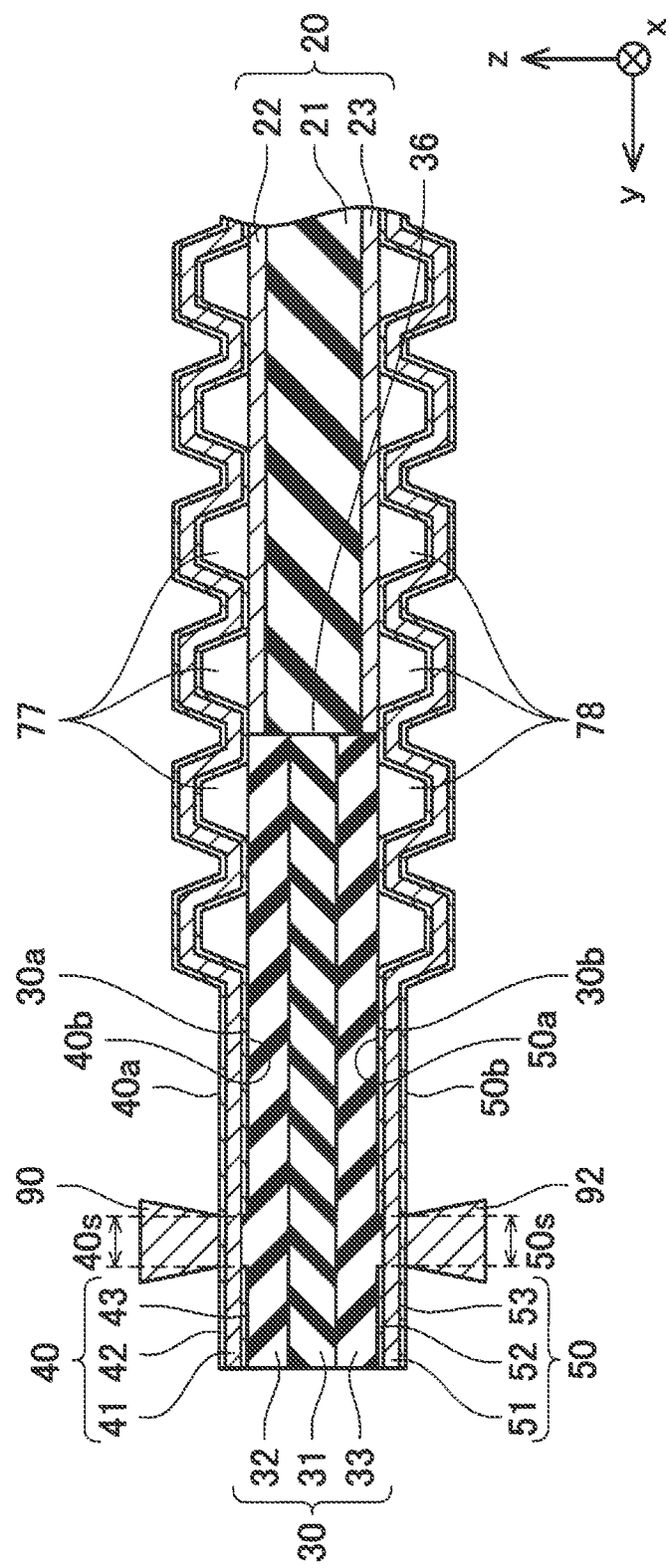
FIG. 13 is an explanatory view of a separator bonding step.

In a manufacturing process of manufacturing the fuel cell 12, the separators 40, 50 manufactured by the above method are bonded to the resin frame 30. In a separator bonding step, first, as illustrated in FIG. 13, the resin frame 30 is sandwiched between the separator 40 and the separator 50 in a state where the MEA 20 is placed in the through-hole 36 of the resin frame 30. Herein, the surface 40b of the separator 40 is brought into contact with the resin frame 30 and the MEA 20, and the surface 50a of the separator 50 is brought into contact with the resin frame 30 and the MEA 20. In a state where the through-hole 36 of the resin frame 30 is closed by the separators 40, 50 as such, the separators 40, 50 are bonded to the resin frame 30. That is, first, as illustrated in FIG. 13, a part of a laminated body including the separator 40, the resin frame 30, and the separator 50 is sandwiched between metal dies 90, 92. Herein, a part, of the laminated body, that includes the ranges 40s, 50s is sandwiched by the metal dies 90, 92. While the laminated body is pressurized by the metal dies 90, 92, the part thus pressurized (that is, the part including the ranges 40s, 50s) is heated to 150° C. to 180° C. via the metal dies 90, 92. Hereby, the resin layers 32, 33 soften in the vicinity of the metal dies 90, 92. After that, the laminated body is cooled, so that the resin layers 32, 33 thus softening harden. Thus, the resin layer 32 is bonded to the separator 40 (that is, the metal plate 41) within the ranges 40s, and the resin layer 33 is bonded to the separator 50 (that is, the metal plate 51) within the ranges 50s. Since dirt is removed from the surface of the metal plate 41 within the ranges 40s by application of the laser beam, the resin layer 32 is bonded to the metal plate 41 with a high adhesive strength. Since dirt is removed from the surface of the metal plate 51 within the ranges 50s by application of the laser beam, the resin layer 33 is bonded to the metal plate 51 with a high adhesive strength. The fuel cell 12 illustrated in FIG. 3 is completed by performing the above-mentioned steps. Since the warping amounts of the separators 40, 50 do not vary so much, it is possible to perform the separator bonding step appropriately. Further, since the warping amounts of the separators 40, 50 do not vary so much, troubles can hardly occur even during conveyance or the like of the separators 40, 50. Accordingly, it is possible to manufacture the fuel cell 12 with a high efficiency percentage.

Figure 14:
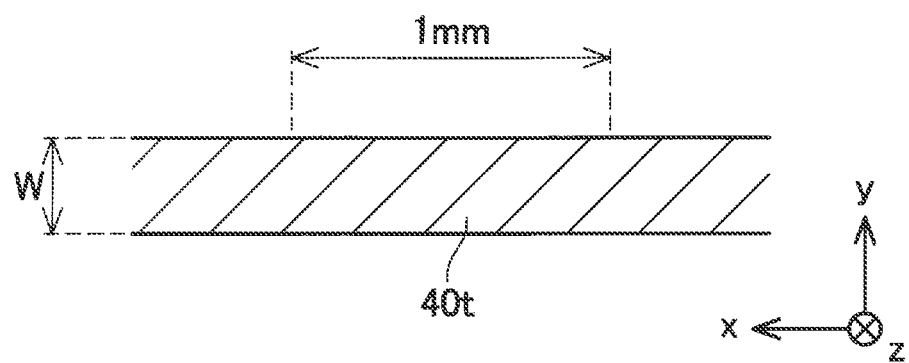
FIG. 14 is an explanatory view of the energy linear density of a laser beam.

Note that the high-energy region and the low-energy region can be defined based on the energy linear density (mJ/mm) of the laser beam. That is, among the laser application ranges, a region in which the energy linear density of the laser beam is high is the high-energy region, and a region in which the energy linear density of the laser beam is low is the low-energy region. The energy linear density of the laser beam indicates energy given by the laser beam per unit distance in a direction where a laser application range extends in a case where the laser application range extends linearly. For example, at a part where the laser application range 40t extends long linearly in the x-direction and has a width W (mm) in the y-direction as illustrated in FIG. 14, the energy linear density indicates energy given to the laser application range 40t within a unit distance (1 mm) in the x-direction. In other words, the energy linear density of the laser beam is a value obtained by integrating the energy density (mJ/mm$^2$) of the laser beam in the width direction (the y-direction in FIG. 14). For example, in FIG. 14, in a case where the laser beam is applied to the laser application range 40t at a uniform energy density E (mJ/mm$^2$), the energy linear density of the laser beam is E·W (mJ/mm). In Embodiment 1, the energy density (mJ/mm$^2$) of the laser beam in the height-energy region is made higher than that in the low-energy region, so that the energy linear density (mJ/mm) of the laser beam in the high-energy region is made higher than that in the low-energy region. The energy linear density (mJ/mm) of the laser beam can also be adjusted based on the width of the laser application range.

In Embodiment 2, the width of the high-energy region is wider than the width of the low-energy region. Further, in Embodiment 2, the laser beam is applied to the high-energy region and the low-energy region at the same energy density. Other configurations of Embodiment 2 are the same as those in Embodiment 1.

Figure 15:
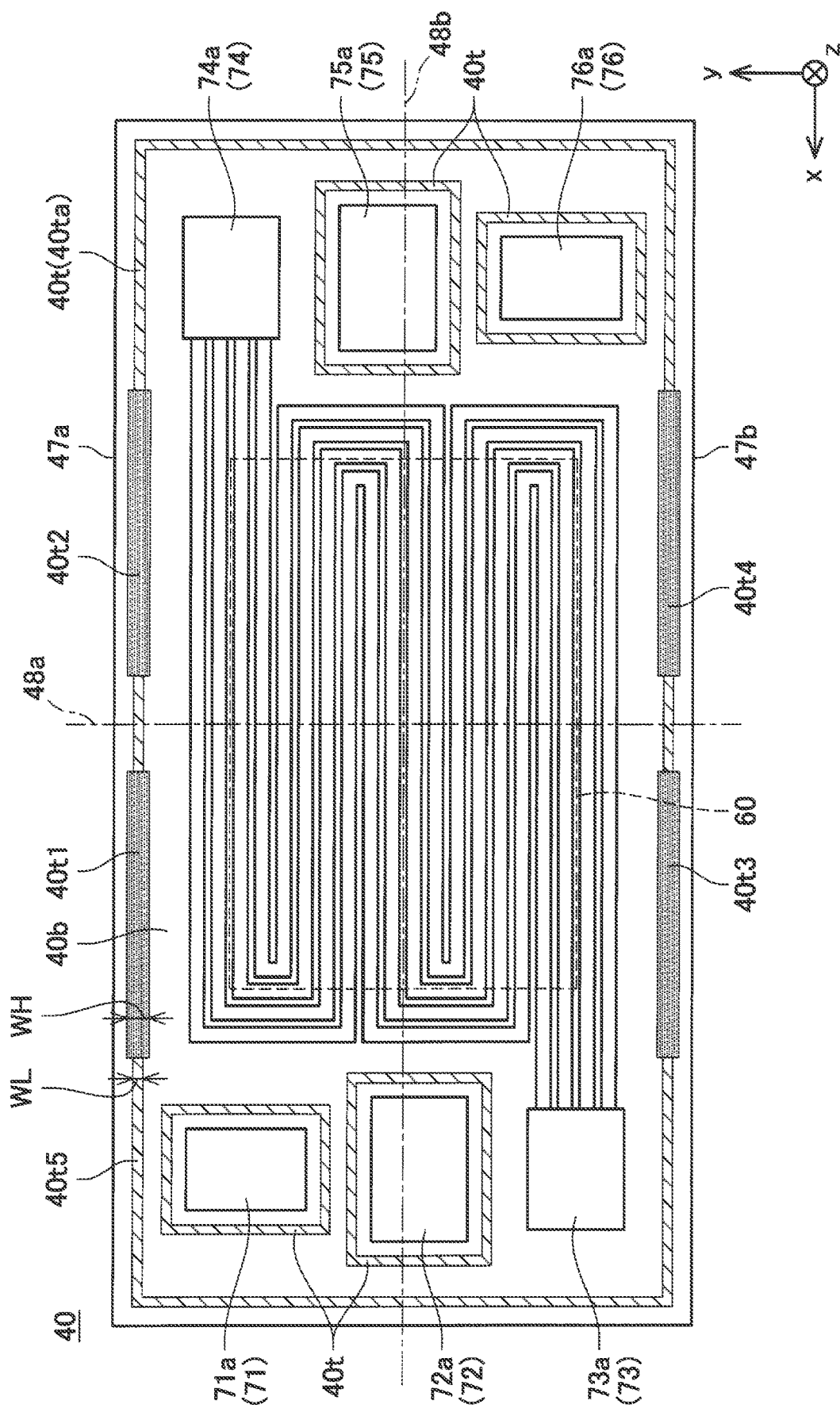
FIG. 15 is a plan view of the surface 40b of the separator 40 and illustrates the laser application ranges 40t in Embodiment 2.

As illustrated in FIG. 15, in Embodiment 2, in the laser application ranges 40t, a width WH of the high-energy regions 40t1 to 40t4 is wider than a width WL of the low-energy regions 40t5. For example, the width WH can be set to a width that is equal to or more than 1.5 times the width WL. For example, the width WH can be set to 4.65 mm, and the width WL can be set to 2.65 mm. In the laser application step, the laser beam is applied such that the laser application ranges 40t are distributed as illustrated in FIG. 15. Further, in Embodiment 2, the laser beam is applied to the high-energy regions 40t1 to 40t4 and the low-energy regions 40t5 at the same energy density E. Accordingly, the energy linear density in the high-energy regions 40t1 to 40t4 is E·WH (mJ/mm), and the energy linear density in the low-energy regions 40t5 is E·WL (mJ/mm). That is, the laser beam is applied to the high-energy regions 40t1 to 40t4 at a higher energy linear density than that of the laser beam applied to the low-energy regions 40t5. Similarly to Embodiment 1, in Embodiment 2, the carbon film 43 is removed within the laser application ranges 40t, and the outer layer part of the metal plate 41 within the laser application ranges 40t melts and solidifies. In the high-energy regions 40t1 to 40t4, the outer layer part of the metal plate 41 melts and solidifies in a range with a width wider than that of the low-energy regions 40t5. On this account, as illustrated in FIG. 12, large warps are caused in ranges corresponding to the high-energy regions 40t1 to 40t4 so that the surface 40b is recessed. When the separator 40 warps as such, a warping amount caused in the whole separator 40 becomes stable, so that the shape of the separator 40 after the laser application step can hardly vary.

Embodiment 3 is a manufacturing method obtained by combining Embodiments 1, 2. In Embodiment 3, the width of the high-energy regions 40t1 to 40t4 is made wider than the width of the low-energy regions 40t5, and the energy density (mJ/mm$^2$) of the laser beam in the high-energy regions is made higher than that in the low-energy region. Even in the manufacturing method, warps are caused as illustrated in FIG. 12, so that a warping amount caused in the whole separator 40 becomes stable. Accordingly, variation in the shape of the separator 40 after the laser application step can be restrained.

Figure 16:
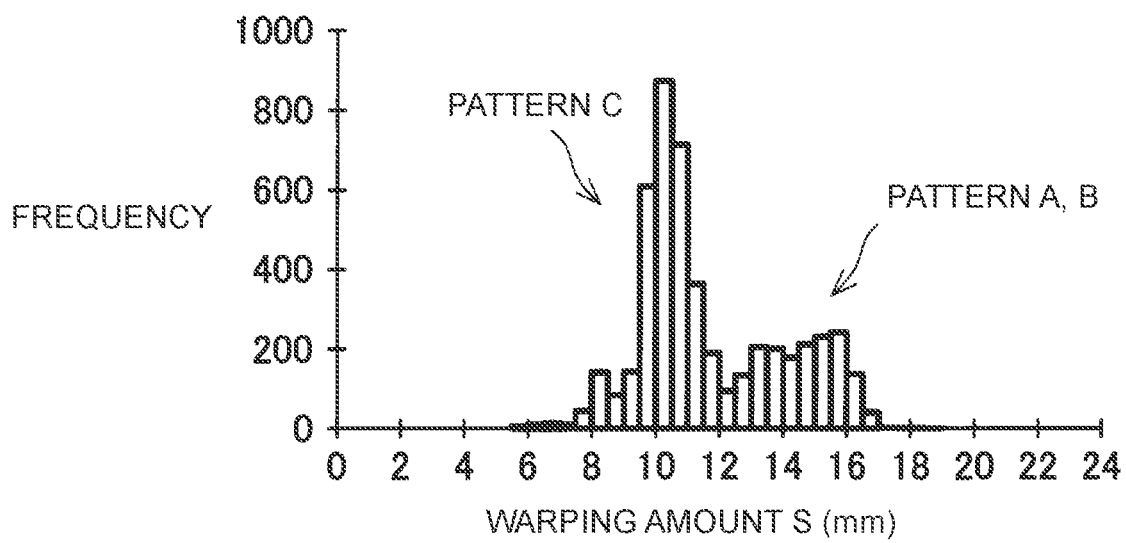
FIG. 16 is a graph illustrating variation in a warping amount S of the separator 40 manufactured by the conventional manufacturing method.
Figure 17:
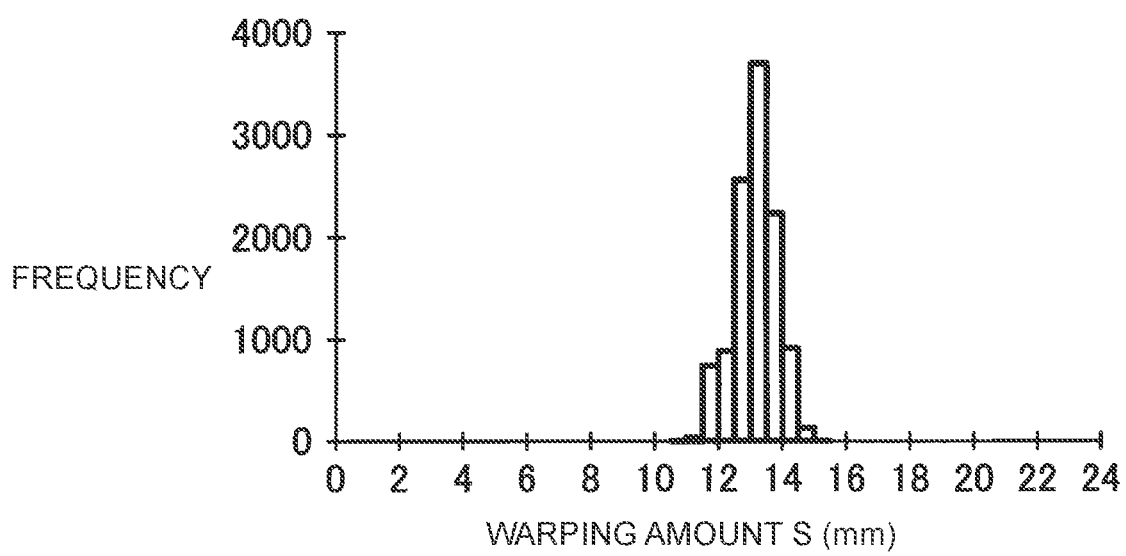
FIG. 17 is a graph illustrating variation in the warping amount S of the separator 40 manufactured by a manufacturing method of Embodiment 3.

FIGS. 16, 17 illustrate variation in the warping amount S caused in the separator 40 in terms of a case where the separator 40 is manufactured by a conventional manufacturing method (that is, a manufacturing method in which the whole laser application ranges 40t have a uniform width, and the laser beam is applied to the whole laser application ranges 40t at a uniform energy density) and a case where the separator 40 is manufactured by the manufacturing method of Embodiment 3. As apparent from FIGS. 16, 17, with the manufacturing method of Embodiment 3, it is possible to reduce variation in the warping amount S.

As described in Embodiments 1 to 3, when the energy linear density (mJ/mm) of the laser beam in the high-energy regions is made higher than that in the low-energy region, it is possible to restrain variations in the warping amount of the separator 40 after the laser application step.

Figure 18:
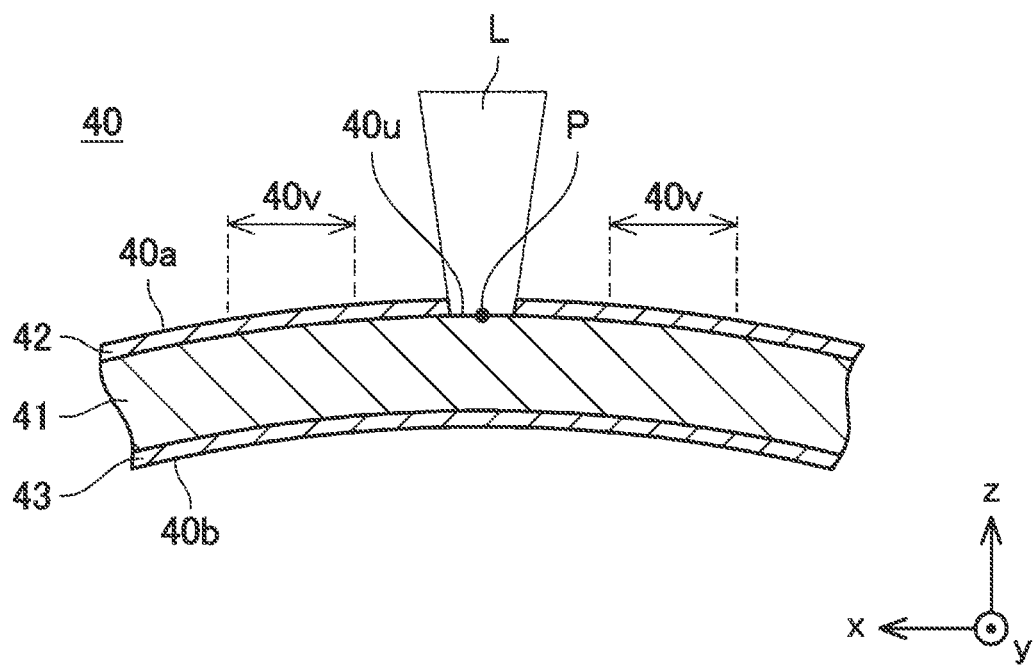
FIG. 18 is an explanatory view of a warp correction step.
Figure 19:
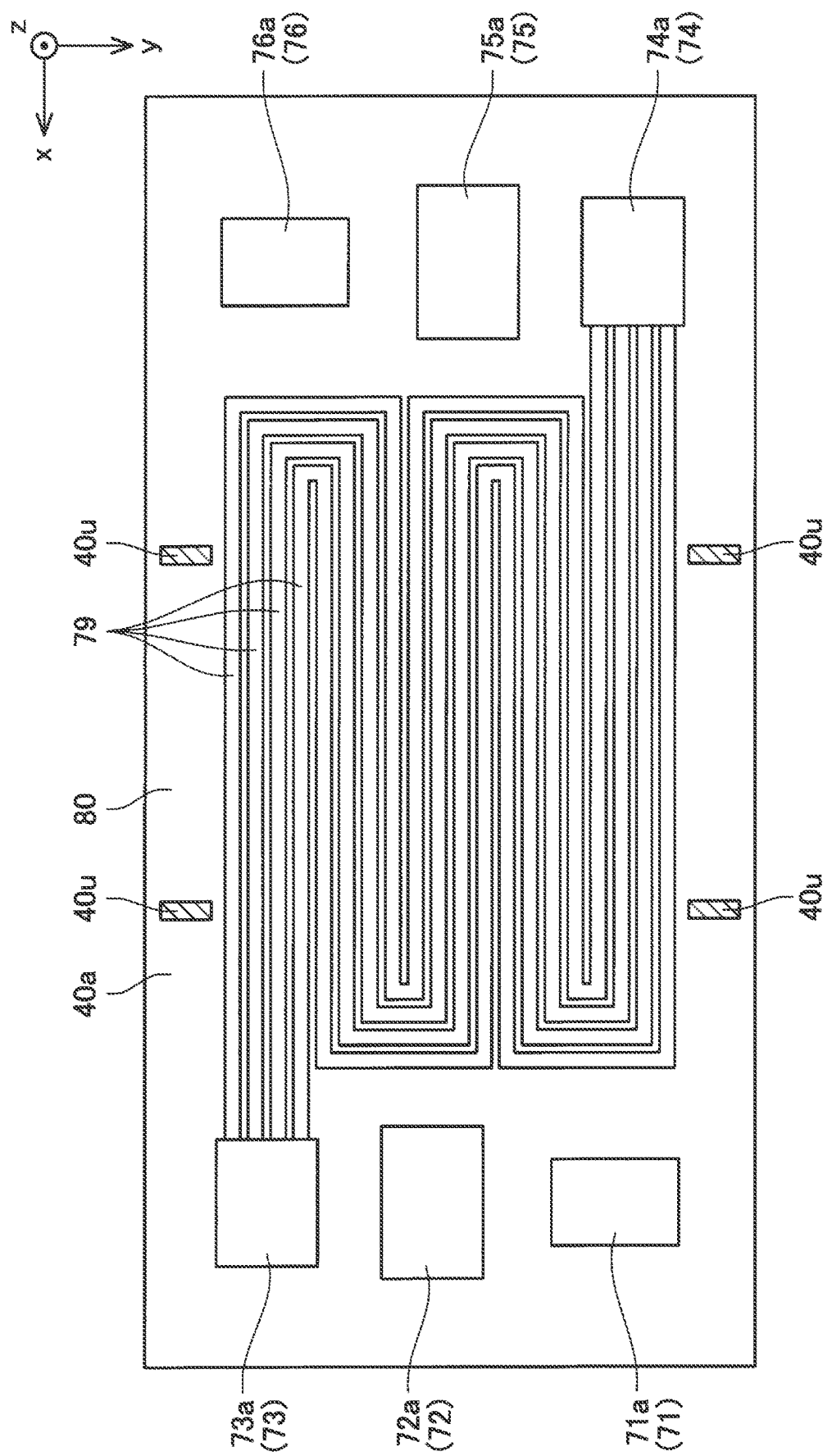
FIG. 19 is a plan view of a surface 40a of the separator 40 and illustrates laser application ranges 40u in the warp correction step.

A manufacturing method of Embodiment 4 includes a warp correction step of correcting the shape of the separator 40 with a large warping amount from among the separators 40. The warp correction step is executed after the laser application step in any of Embodiments 1 to 3 is executed. The warp correction step is executed only on the separator 40 with a large warping amount among the separators 40 subjected to the laser application step. In the warp correction step, the laser beam L is applied to a part of the surface 40a (that is, a back surface opposite to the surface 40b) of the separator 40, as illustrated in FIG. 18. Herein, the laser beam L is applied to a range including a top portion P (a part most projecting on the surface 40a as illustrated in FIGS. 12, 18) of a warp caused in the separator 40. FIG. 19 illustrates laser application ranges 40u to which the laser beam is applied in the warp correction step. As illustrated in FIG. 19, grooves 79 corresponding to the passages 77 (see FIGS. 3, 4) are formed on the surface 40a of the separator 40. Further, a flat region 80 where no groove is provided is present around a region where the grooves 79 are provided. The laser application ranges 40u are placed in the flat region 80. As described above, in the laser application step, the separator 40 warps on a section x-z as illustrated in FIG. 12. Accordingly, an edge line of the top portion P of the warp extends linearly in the y-direction on the surface 40a. In the warp correction step, the laser beam is applied such that the laser application ranges 40u extend long linearly in the y-direction along the edge line of the top portion P as illustrated in FIG. 19. That is, herein, the laser beam is applied such that the laser application ranges 40u extend linearly along a direction intersecting with the long sides 47a, 47b. When the laser beam L is applied to the surface 40a, the carbon film 42 is removed within the laser application ranges 40u. Further, the outer layer part of the metal plate 41 within the laser application ranges 40u melts and solidifies. At this time, the outer layer part of the metal plate 41 on the surface 40a side contracts. On this account, the warping amount of the separator 40 at the top portion P becomes small. Thus, the warp correction step can reduce the warping amount of the separator 40. By executing the warp correction step on the separator 40 with a large warping amount, it is possible to further reduce variation in the warping amount of the separator 40.

Figure 20:
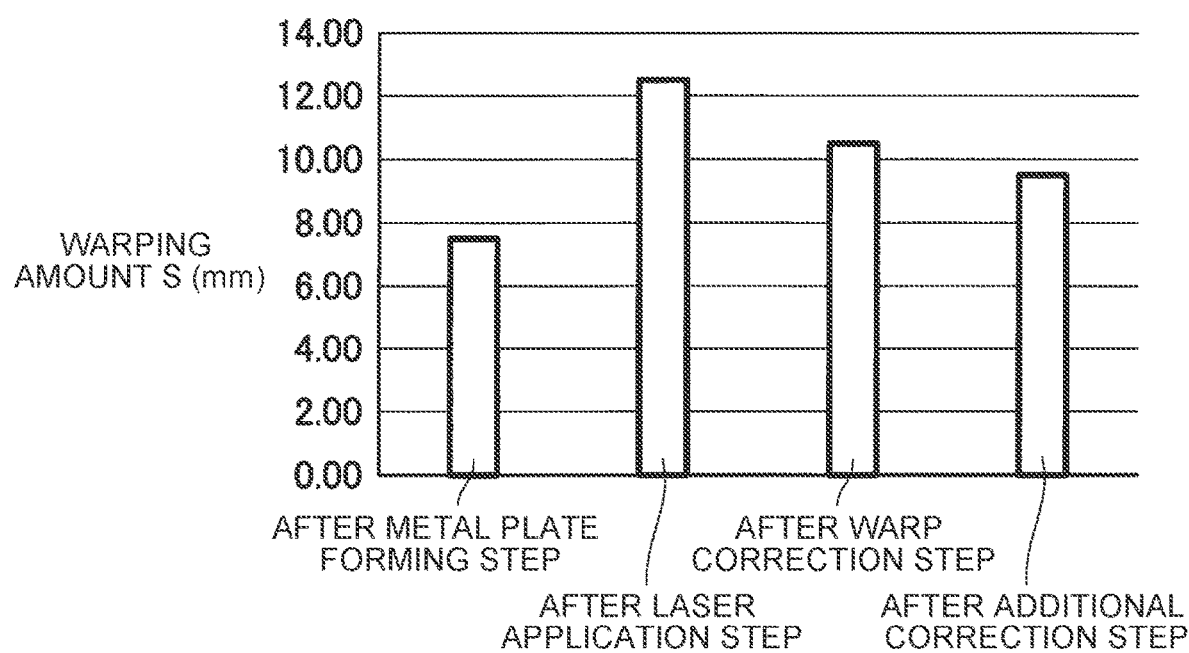
FIG. 20 is a graph illustrating a reduction in a warping amount S by the warp correction step and an additional correction step.

Note that an additional correction step of applying the laser beam to a surrounding range 40v (see FIG. 18) around the top portion P may be executed after the warp correction step. This accordingly makes it possible to further reduce the warping amount of the separator 40. FIG. 20 illustrates respective warping amounts of the separator 40 after the metal plate forming step, after the laser application step, after the warp correction step, and after the additional correction step. As apparent from FIG. 20, the warping amount of the separator 40 is reduced by the warp correction step, and the warping amount of the separator 40 is further reduced by the additional correction step.

Note that, in Embodiment 4, the warp correction step is performed only on the separator 40 with a large warping amount. However, the warp correction step may be performed on all the separators 40 to be manufactured. With this configuration, it is possible to reduce the warping amounts of the separators 40.

Note that, in Embodiments 1 to 4, the surfaces of the metal plates 41, 51 are covered with a carbon film, but the surfaces of the metal plates 41, 51 may not be covered with a carbon film. That is, the metal plates 41, 51 may be exposed over the whole surfaces of the separators 40, 50. In a manufacturing process of the separators 40, 50 configured as such, a laser beam may be applied to the metal plates 41, 51 for the purpose of removing dirt on the surfaces of the metal plates 41, 51. In this case, with the use of the technologies of Embodiments 1 to 4, it is possible to restrain variation in the warping amounts of the separators 40, 50. Further, in this case, the surface from which dirt has been removed by the laser beam can be bonded to the resin frame with a high adhesive strength.

The embodiments have been described above in detail, but the embodiments are only examples and do not limit the scope of Claims. The technology described in the scope of Claims includes the foregoing example with various modifications and changes. Each of and various combinations of the technical elements described in the present specification or the drawings achieve technical utility, and the technical elements are not limited to the combination stated in the claims at the time of filing. Further, the technologies described in the present specification or the drawings can achieve a plurality of objects at the same time and have technical usefulness by achieving one of those objects.

What is claimed is:

1. A manufacturing method for manufacturing a separator for a fuel cell, the manufacturing method comprising a step of applying a laser beam to a surface of a plate-shaped metal plate having a rectangular shape such that an application range of the laser beam extends linearly, wherein:
   in the step, the laser beam is applied such that the application range includes a high-energy region in which energy to be given by the laser beam per unit distance in a direction
   where the application range extends linearly is high, and a low-energy region in which the energy is low;
   the high-energy region includes a first region, a second region, a third region, and a fourth region separated from each other;
   the first region and the second region extend in parallel to one of long sides provided as a pair in the rectangular shape;
   the third region and the fourth region extend in parallel to the other one of the long sides;
   a central line of the surface is placed between the first region and the second region and between the third region and the fourth region, the central line extending in a direction perpendicular to the long sides;
   the low-energy region includes a fifth region, a sixth region, a seventh region, and an eighth region separated from each other;
   a part of the fifth region extends in parallel to one of short sides provided as a pair in the rectangular shape, and a part of the sixth region extends in parallel to the other one of the short sides;
   the seventh region is between the first region and the second region;
   the eighth region is between the third region and the fourth region;
   the first region and the seventh region are connected, the seventh region and the second region are connected, the second region and the fifth region are connected, the fifth region and the fourth region are connected, the fourth region and the eighth region are connected, the eighth region and the third region are connected, the third region and the sixth region are connected, the sixth region and the first region are connected; and
   the first to eighth regions are configured continuously as a rectangle.

2. The manufacturing method according to claim 1, wherein a width of the high-energy region is wider than a width of the low-energy region, and the laser beam is applied to the high-energy region and the low-energy region at a same energy density.

3. The manufacturing method according to claim 1, wherein, in the step, the laser beam is applied such that the application range extends annularly in parallel to an outer peripheral edge of the surface.

4. The manufacturing method according to claim 1, wherein:
   in the step, a warp is caused in the metal plate such that the surface has a recessed shape; and
   the manufacturing method further includes a step of applying the laser beam to a range including a top portion of the warp on a back surface of the metal plate, the back surface being opposite to the surface of the metal plate.

5. The manufacturing method according to claim 4, wherein, in the step of applying the laser beam to the back surface, the laser beam is applied such that an application range of the laser beam extends linearly along a direction intersecting with the long sides.

6. The manufacturing method according to claim 4, wherein:
   the back surface of the metal plate includes a groove region in which grooves are formed, and a flat region placed around the groove region; and
   in the step of applying the laser beam to the back surface, the laser beam is applied to the flat region.

\* \* \* \* \*